(12) United States Patent
Schrag (10) Patent No.: US 11,465,555 B2
(45) Date of Patent: *Oct. 11, 2022

(54) TRAILER VISIBILITY SAFETY SYSTEM

(71) Applicant: IdeaTek Equity Group, LLC, Buhler, KS (US)

(72) Inventor: Steven Adam Schrag, Hutchinson, KS (US)

(73) Assignee: IdeaTek Equity Group, LLC, Buhler, KS (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/341,073

(22) Filed: Jun. 7, 2021

(65) Prior Publication Data

US 2021/0339675 A1  Nov. 4, 2021

Related U.S. Application Data

(63) Continuation of application No. 16/895,110, filed on Jun. 8, 2020, now Pat. No. 11,027,645, which is a continuation of application No. 16/158,530, filed on Oct. 12, 2018, now Pat. No. 10,676,021.

(60) Provisional application No. 62/572,070, filed on Oct. 13, 2017.

(51) Int. Cl.
*B60Q 1/30* (2006.01)
*B60D 1/62* (2006.01)
*B60Q 1/24* (2006.01)
*B60D 1/64* (2006.01)

(52) U.S. Cl.
CPC ............ *B60Q 1/305* (2013.01); *B60D 1/62* (2013.01); *B60D 1/64* (2013.01); *B60Q 1/24* (2013.01)

(58) Field of Classification Search
CPC .......... B60D 1/62; B60D 1/64; B60Q 1/0035; B60Q 1/24; B60Q 1/305; B60Q 1/46; B60Q 1/50
See application file for complete search history.

(56) References Cited

U.S. PATENT DOCUMENTS

| 6,411,204 | B1 * | 6/2002 | Bloomfield | B60Q 1/52 340/471 |
| 7,347,507 | B1 * | 3/2008 | Stillinger | B60T 8/1708 303/7 |
| 2015/0306928 | A1 * | 10/2015 | McCollum | B60Q 1/305 340/431 |
| 2018/0099712 | A1 * | 4/2018 | Bean | B62D 63/08 |

* cited by examiner

*Primary Examiner* — Quan Zhen Wang
*Assistant Examiner* — Rajsheed O Black-Childress
(74) *Attorney, Agent, or Firm* — Erise IP, P.A.

(57) ABSTRACT

A safety lighting system for use with trailers is described herein. In some embodiments, the trailer lighting system comprises a sensor, a controller, and safety lights. The safety lighting system may be used for illuminating trailers while being towed, for example, in shipping yards, construction yards, and shipping and receiving docks. The safety lighting system may be activated upon connection of a pneumatic system with a spotting tractor and deactivated upon establishing an electrical connection from a tractor to the trailer.

20 Claims, 6 Drawing Sheets

TRAILER VISIBILITY SAFETY SYSTEM

RELATED APPLICATIONS

This application is a continuation, and claims priority benefit, with regard to all common subject matter, of earlier-filed U.S. patent application Ser. No. 16/895,110, filed Jun. 8, 2020, and entitled "TRAILER VISIBILITY SAFETY SYSTEM," now U.S. Pat. No. 11,027,645, issued on Jun. 8, 2021, ("the '645 Patent"). The '645 Patent is a is a continuation, and claims priority benefit, with regard to all common subject matter, of earlier-filed U.S. patent application Ser. No. 16/158,530, filed Oct. 12, 2018, and entitled "TRAILER VISIBILITY SAFETY SYSTEM," now U.S. Pat. No. 10,676,021, issued on Jun. 9, 2020, ("the '021 Patent'"). The '021 Patent is a non-provisional patent application and claims priority benefit, with regard to all common subject matter, of earlier-filed U.S. Provisional Patent Application No. 62/572,070, filed Oct. 13, 2017, and entitled "TRAILER VISIBILITY SAFETY SYSTEM." The identified earlier-filed patent applications are hereby incorporated by reference in their entirety into the present application.

BACKGROUND

1. Field

Embodiments of the invention are broadly directed to safety lighting systems for semi-tractor trailers that enhance visibility to reduce the likelihood of accidents. More specifically, embodiments of the invention provide trailer safety lighting systems that detect connections established between the trailer and a tractor to selectively activate attention-drawing lights.

2. Related Art

The yard of a distribution warehouse facility that loads, unloads, and/or maintains semi-tractor trailers can be a busy, dangerous place. As drivers of spotting tractors move trailers from one dock to another, it is difficult for drivers and pedestrians to remain constantly aware of every tractor and trailer. Particularly when several trailers are being loaded, unloaded, maintained, and moved simultaneously, a lack of sufficient attention or visibility often leads to collisions. This can result in injury to people and damage to property, as well as time lost. Accidents can be reduced by activation of safety lighting on a trailer being moved or maintained.

Accidents can occur when trailers are being moved about a distribution warehouse yard, often due to circumstances that might have been avoided with increased awareness and/or visibility. Safety lighting systems attached to a trailer can help address these problems, but require power. Safety lighting systems attached to spotting tractors have proven insufficient, since the taller trailer blocks much of the light produced.

Conventional methods of providing safety lighting incorporate one or more beacon lights onto the cabs of spotting tractors used at a warehouse facility. This solution has proven insufficient due to the height difference between the spotting tractor and the trailer being towed. Typically, a trailer is substantially (several feet) taller than a spotting tractor, blocking a portion of the light produced by beacons affixed to the tractor's cab. As such, these methods fail to provide a complete 360° of visibility.

Another possible solution involves use of the over-the-road lighting systems that are manufactured into trailers (such as running lights, tail lights, brake lights, turn signals, etc.) to provide safety lighting. This solution requires the driver of a spotting tractor to establish an electrical connection between the spotting tractor and the trailer, as if he is preparing to haul the trailer on public roads. Establishing this electrical connection can be very time- and effort-intensive. Furthermore, it can often lead to costly damage of electrical cords or plugs. Additionally, the driver may simply forget or neglect to establish the electrical connection at all, resulting in a complete lack of safety lighting.

Another possible solution involves activating trailer lights manually by a driver or maintenance person attaching the tractor electrical system to the trailer electrical system and incorporating lights on the exterior of the trailer. This adds an extra step when coupling the tractor to the trailer increasing complexity and decreasing efficiency. This may also result in a driver or maintenance person forgetting to decouple the tractor from the trailer potentially causing injury to a person and damage to property.

What is needed is a convenient, dependable safety lighting system for semi-tractor trailers that provides high visibility in all directions for a trailer being moved or maintained while requiring minimal additional setup or control by the driver of a spotting tractor. Further, the safety lighting system should not activate when the trailer is attached to a road tractor, so that the system goes unnoticed by drivers having no need for its function.

SUMMARY

Embodiments of the invention solve these problems by providing a system for increasing the visibility of a trailer when the trailer is attached to a pneumatic line of a tractor. In a first embodiment of the invention, a safety lighting system for illuminating a trailer comprises a safety light configured to be emplaced on an exterior surface of the trailer, a power source, and a controller configured to detect if a pneumatic connection has been established between the trailer and a tractor, detect if an electrical connection has been established between the trailer and the tractor, and activate the one or more lights if the pneumatic connection has been established and the electrical connection has not been established.

A second embodiment is directed to a safety lighting system for illuminating a trailer, comprising one or more lights disposed on an exterior surface of a trailer, a power source, a sensor, and a controller, wherein the sensor is configured to send a signal indicative of a pressure from a pneumatic connection, and wherein the controller is configured to activate the one or more lights based on the detection of the signal indicating that the pressure is above a minimum threshold.

A third embodiment is directed to a method for illuminating a trailer using a safety lighting system, the method comprising the steps of detecting, using a pressure sensor, a pressure from a pneumatic line connected from a tractor to the trailer, detecting, using an electrical sensor, that an electrical connection has not been established between the tractor and the trailer, activating, based on the detection that the pneumatic line is connected and the detection that the electrical connection is not established, at least one light using a power source located on the trailer; and deactivating the at least one light upon detection that the electrical connection between the tractor and the trailer is established.

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the invention will be apparent from the following detailed description of the embodiments and the accompanying drawing figures.

BRIEF DESCRIPTION OF DRAWINGS

Embodiments of the invention are described in detail below with reference to the attached drawing figures, wherein.

The drawing figures do not limit the invention to the specific embodiments disclosed and described herein. The drawings are not necessarily to scale, emphasis instead being placed upon clearly illustrating the principles of the invention.

DETAILED DESCRIPTION

Embodiments of the invention are directed to a safety lighting system that provides one or more safety lights on the exterior surface of a trailer coupled to a power source and a controller. In embodiments of the invention, the controller is configured to sense if a pneumatic connection has been established between the trailer and a tractor. Further, in embodiments of the invention, the controller is configured to sense if an electrical connection has been established between the trailer and a tractor. Further yet, in embodiments of the invention, the controller is configured to activate the one or more safety lights if a pneumatic connection has been established and an electrical connection has not been established between the trailer and the tractor. Since the pneumatic connection typically releases the trailer brakes allowing the trailer to be moved the safety lights will be on when the trailer is in motion. Further, since the electric connection is established to tow the trailer along the roadway, the safety lights may not be necessary thus when the electric connection is established the safety lights may be disabled.

The following description of embodiments of the invention references the accompanying illustrations that illustrate specific embodiments in which the invention can be practiced. The embodiments are intended to describe aspects of the invention in sufficient detail to enable those skilled in the art to practice the invention. Other embodiments can be utilized and changes can be made without departing from the scope of the invention. The following detailed description is, therefore, not to be taken in a limiting sense.

In this description, references to "one embodiment," "an embodiment," or "embodiments" mean that the feature or features being referred to are included in at least one embodiment of the technology. Separate references to "one embodiment," "an embodiment," or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments, but is not necessarily included. Thus, the current technology can include a variety of combinations and/or integrations of the embodiments described herein.

A tractor is a semi-tractor, road tractor, truck, car, recreational vehicle, or any other vehicle that may be used to tow a trailer. Typical tractors seen on the open highway are known as "road tractors," which are typically larger than spotting tractors. As mentioned above, in a loading and unloading environment, such as a distribution warehouse yard, spotting tractors are used to quickly shuffle trailers between various locations such as docks, maintenance areas, and parking zones.

In order to move a trailer, the driver of any tractor, spotting or road, must first establish a pneumatic connection between the tractor and the trailer. This pneumatic connection supplies the necessary air pressure for releasing the trailer's brakes. The trailer brakes are locked when the trailer is not connected to the tractor and when connected to the tractor the brakes typically automatically unlock when a service pneumatic line is attached. When preparing to haul the trailer over-the-road, the driver must also establish an electrical connection between the road tractor and the trailer in order to power systems such as the trailer's running lights, tail lights, brake lights, turn signals, etc. However, these systems require power from the electrical connection and are not absolutely necessary when moving the trailer with the spotting tractor in a warehouse environment. In the interests of speed, increased efficiency, and decreased wear on cords and plugs as discussed above, typically electrical connections are not established between trailers and spotting tractors in such an environment. This causes the trailers to not be lit and thus not as visible as trailers on the roadway.

Embodiments of the invention may provide heightened visibility and awareness of the trailer to other drivers and bystanders. Embodiments may provide attention-grabbing lighting such as in a full 360° range of visibility around the trailer. Embodiments of the safety lighting system may be incorporated into the trailer at the time of its manufacture. In alternative embodiments the safety lighting system may be added to the trailer after market. Embodiments of the invention may include components integrated into control or support structures of tractors and/or trailers, such as a dashboard or a throttle, or may be completely freestanding. Lights and/or controllers in embodiments of the invention may be mounted at any location or set of locations on the trailer.

Broadly, some embodiments of the invention comprise a plurality of safety lights coupled to a controller and a power source. The safety lights may be light-emitting diode (LED) "bullet" lights, or any other type of safety light. The controller may be automatically activated upon detection of a pressure source such as from a service pneumatic line attachment. In some embodiments, when the service pneumatic line is attached a pressure sensor may sense the pressure and send a signal to the controller. Upon receiving the signal from the pressure sensor, the controller may monitor the signal. When the signal indicates that a minimum pressure threshold has been reached the controller may signal the lights to activate. The lights may strobe, remain constant, or may be different colors depending on the different signals that may be used to indicate different modes.

Embodiments of the invention provide a safety lighting system attached to a trailer that does not require power from an electrical connection established between the trailer and a tractor. Rather, embodiments of the invention are powered by a power source mounted at a location on the tractor, such as, for example, on its under side. Further, embodiments of the invention do not require a driver to manually activate the system. Rather, embodiments of the invention activate automatically when a pneumatic connection is established between the trailer and a tractor. This sensing, for example, may comprise measuring a "high" voltage reading (12 V) on a line coupled to a pressure sensor on a pneumatic hose when the pneumatic connection is established, and measuring a "low" voltage reading (0 V) when the pneumatic connection is not established. Such a configuration provides safety lighting that cannot be forgotten, neglected, or circumvented, since the air pressure supplied by the pneumatic connection is necessary to release the trailer's brakes.

Figure 1:
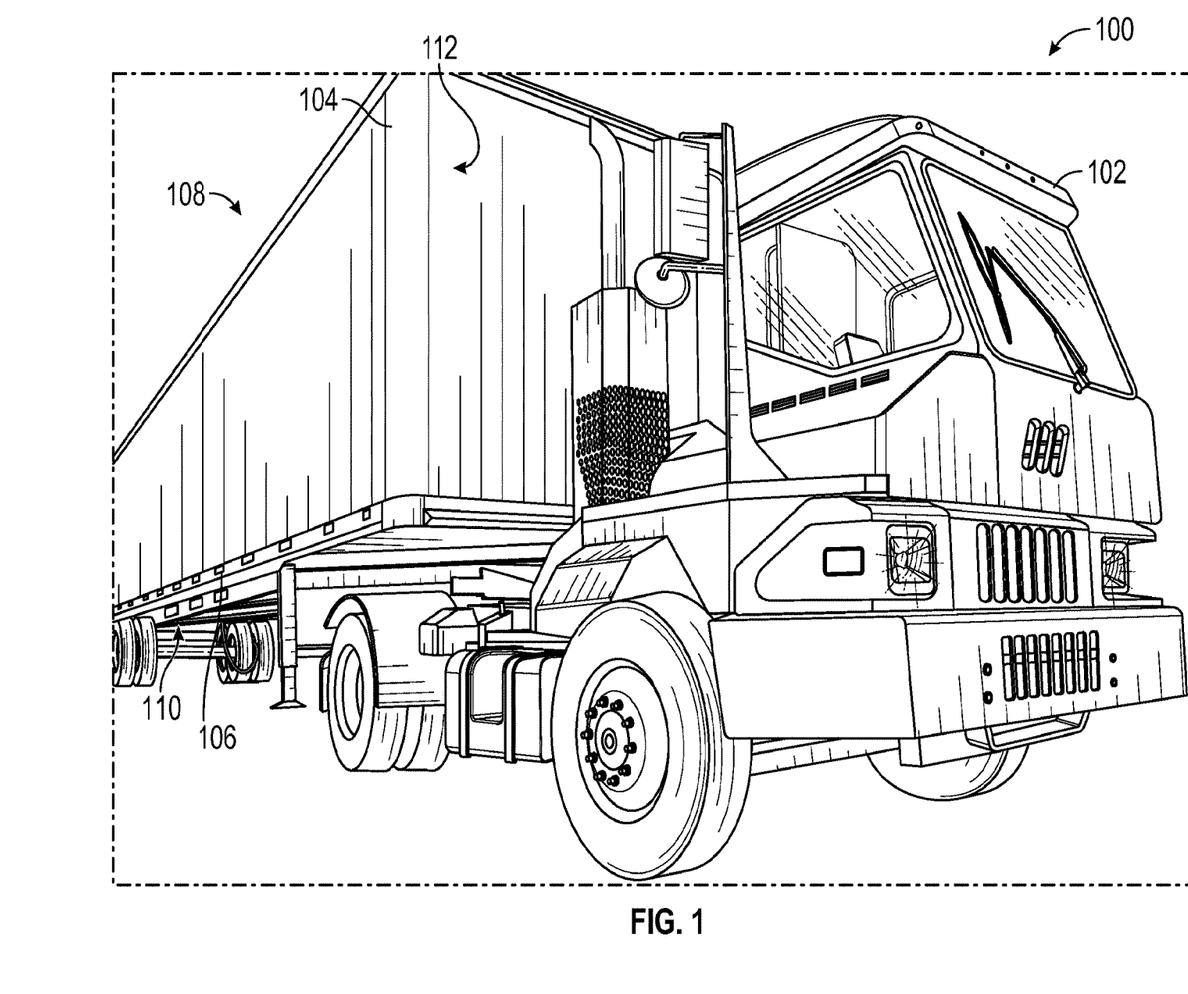
FIG. 1 depicts an exemplary embodiment of a tractor and trailer system.

Turning first to an exemplary embodiment of a tractor-trailer 100 including a tractor 102 and a trailer 104 depicted in FIG. 1 where the tractor 102 is coupled to the trailer 104 for transport. The tractor 102 may be a spotting tractor and may be coupled to the trailer 104 for transport around a distribution yard or shipping and receiving docks at warehouses or shore docks. The tractor 102 may be specifically designed for this activity however in some embodiments a "road" tractor, car, truck, recreational vehicle, or any other vehicle that may be capable of towing the trailer 104.

Similarly, the trailer 104 as depicted is a semi-trailer. In some embodiments, the trailer 104 may carry vehicles, animals, food/drink and/or refrigerated items, or any other item, product, or good that may need to be transported. The trailer 104 may have safety lights 106 mounted on any portion of the trailer 104 to increase visibility and awareness to nearby workers and other drivers. The safety lights 106 may be mounted on the upper edges 108 the lower edges 110 the vertical edges 112 or on any side or face. These configurations are merely examples and the safety lights 106 may be mounted anywhere on the trailer 104 to increase visibility.

The safety lights 106 may be mounted at any set of desired locations, and may be movable by a driver to different locations on the trailer 104. The lights 106 may be permanently built into the structure of the trailer 104, removably mounted with hardware such as screws or bolts, magnetically affixed, and/or mounted to a set of docking stations that are otherwise affixed to the exterior surface of the trailer 104.

The safety lights 106 may be included in a safety lighting system that controls the lights 106 to display indicative of the state of the trailer 104. For example, the trailer 104 may not be coupled to the tractor 102 or may be coupled to the tractor 102. Further, the trailer 104 may be coupled to the tractor 102 pneumatically, electrically, or mechanically. Generally, the safety lighting system may indicate the mode of the trailer 104 for signaling workers such that the state of the trailer 104 is known. In general, the safety lighting system may comprise an input, either such as a sensor or interface, a controller, and lights and is discussed in more detail below.

In some embodiments the spotting tractor 104 may not be a spotting tractor and the trailer 104 may not be a standard trailer. In some embodiments, the trailer 104 may be permanently attached to the tractor 102 and optionally electrically or pneumatically attached and in some embodiments the trailer 104 and tractor 102 are separate and can be mechanically coupled as well. In some embodiments, the spotting tractor 104 may be a recreational vehicle, automobile such as a truck, bus, or car, or, in some embodiments, a train. In some embodiments, the trailer 104 may be a refrigeration trailer, towing trailer for towing a vehicle such as a car, boat, or truck. In embodiments, the trailer 104 may be connected to the tractor 102 such as the bed of a pickup truck or a cement mixer. Many embodiments and configurations of a trailer 104 and safety lighting system may be imagined in which a safety lighting system as described in embodiments may be used with many embodiments of a trailer 104.

Figure 2:
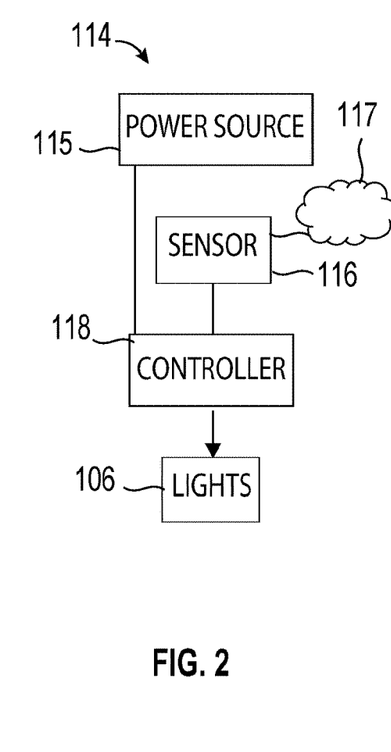
FIG. 2 depicts an diagram representing an exemplary embodiment of a safety lighting system.

FIG. 2 depicts an exemplary safety lighting system 114 for controlling the safety lights 106 for some embodiments of the invention comprising a power source 115, a sensor 116, a controller 118, and the safety lights 106. In some embodiments the controller may connected to a network 117 for wireless transmission. The description provided herein is a high level overview of major components in embodiments of the invention. A more detailed a description is provided below. Generally, a sensor 116 detects a mode of the trailer 104 or an input to the trailer 104. In some embodiments, the sensor 116 detects a pneumatic connection and sends an electrical signal to the controller 118. The controller 118 may control the function of the safety lights 106 based on the signal received from the sensor 118. The controller 118 may also have stored functionality that controls the safety lights 106 based on time, any number of electrical, pneumatic, mechanical, or hydraulic connections or inputs. The controller 118 may also interface with a user via user inputs or wireless communication via infrared, radio frequency communication, or via the internet provided by a server. As such, embodiments of the invention may incorporate structures facilitating wireless communication, such as a wireless Internet modem and/or cellular telephone antenna for transmission over the network 117.

Figure 3:
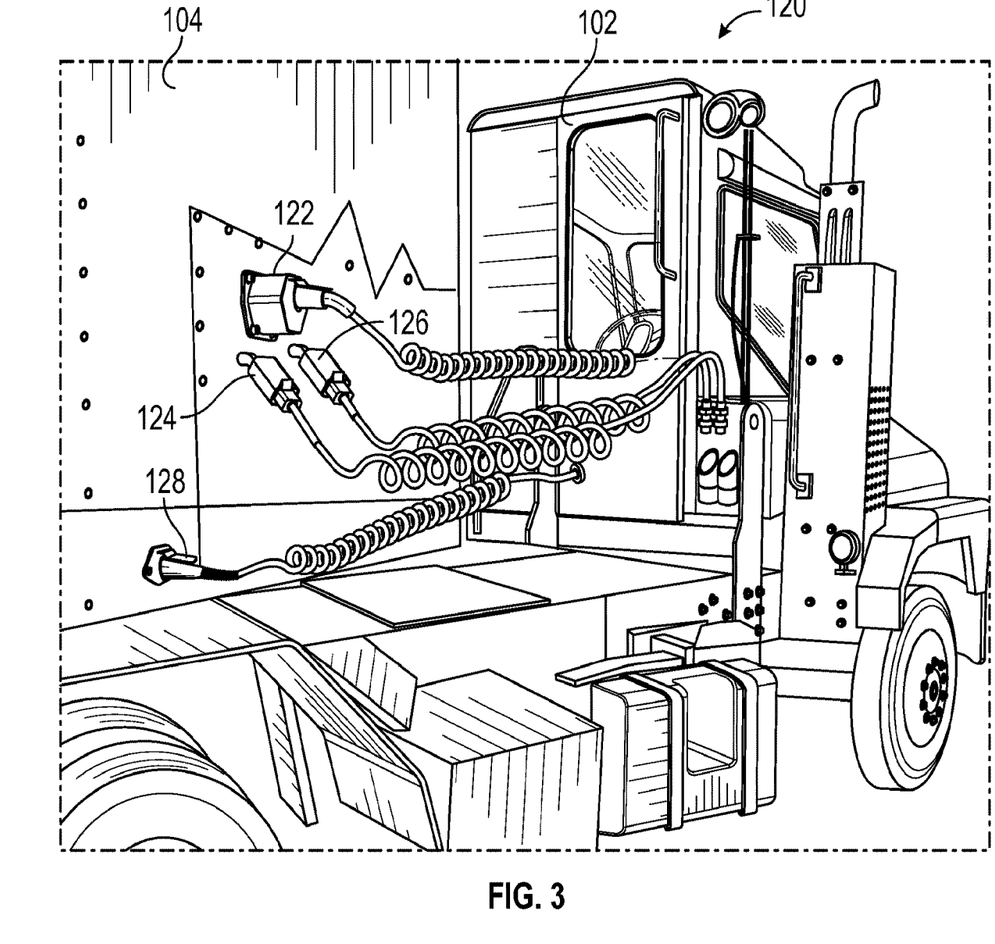
FIG. 3 depicts an exemplary embodiment of a coupling system of a tractor and trailer system.

Turning now to an embodiment of the invention depicted in FIG. 3 presenting a coupling 120 between the spotting tractor 102 and the trailer 104. The spotting tractor 102 is electrically connected to the trailer 104 by the electric line 122 which may connect to the trailer 104 using a 7-pin connector. Though a 7-pin connector is typical in the field and described in embodiments of the invention, any connector may be used that transfers electrical signals from the spotting tractor 102 to the trailer 104. In embodiments, the electric line 122 may not need to be connected to activate the safety lights 106. In some embodiments, connecting the electric line 122 disables the safety lights 106. The spotting tractor 102 is further connected to the trailer 104 by two pneumatic lines; a service line 124 and an emergency line 126. A stinger line 128 is also connected between the spotting tractor 102 and the trailer 104. The stinger line 128 typically carries electrical power and ground for batteries on the trailer to operate additional, or optional, features such as a liftgate or a refrigeration system.

In order to move the trailer 104, the driver of any tractor, spotting or road, must first establish a pneumatic connection between the tractor 102 and the trailer 104. This pneumatic connection supplies the necessary air pressure for releasing the trailer's 104 brakes. The pneumatic connection may be established between the trailer 104 and the tractor 102 via the service line 124 and the emergency line 126. When preparing to haul the trailer 104 over-the-road, the driver must also establish an electrical connection between the road tractor and trailer 104 in order to power systems such as the trailer's running lights, tail lights, brake lights, turn signals, etc. The electrical connection may be established via the electrical line 122. Typically, these systems require power from the electrical connection and are not absolutely necessary when moving the trailer 104 with the spotting tractor 102 in a warehouse environment. In the interests of speed, increased efficiency, and decreased wear on cords and plugs, typically electrical connections are not established between trailers and spotting tractors in such an environment.

In some embodiments, the safety lighting system 114 may detect connection of the service line 124. The sensor 116, in some embodiments a pressure sensor, may be used to detect the pressure supplied when the service line 124 is connected. The controller 118 coupled to or housing the sensor 116 may receive signals from the sensor 116 and control the safety lights 106 based on the signals. For example, the controller 118 may require a minimum pressure threshold before signaling the safety lights 106 to activate. This ensures that the safety lights 106 may not be accidentally activated. Since the service line 124 must be connected to move the trailer 104 the pressure in the service line 124 required to release the trailer 104 brakes is known. The minimum pressure threshold may be a constant value or a function of the required pressure, or the expected pressure, to release the brakes. Any mathematical function or constant value associated with the pressure sensor output may be used as a pressure threshold value for activation of the safety lights 106. In some embodiments, multiple pressure threshold values may be used to produce different light modes such as different colors, lighting combinations, or different blinking patterns. The safety light 106 display may be indicative of the mode of the trailer 104 or tractor 102.

The emergency line 126 may be coupled to the trailer 104 and may control the trailer 104 emergency braking system. The emergency line 126 may provide air to the trailer brake system air tanks and energy to the brakes to enable the emergency brakes to activate. The emergency brakes may activate when an emergency is detected such as unexpected release in pressure or activation by the driver. The unexpected release in pressure may be the result of a loss in pressure in the air system due to damage or disconnect of the air couplers and/or hoses or activation by the driver. In embodiments described herein, only the service line 124 is used for activation of the lights 106 however, it can be imaged that the emergency line 126 or any other pneumatic, hydraulic, or electrical line or mechanical connection may be used.

Activation of the safety lighting system 114 would not typically be necessary for trailers being hauled over-the-road, whether or not a pneumatic connection has been established. Typically, establishment of an electrical connection between the trailer 104 and the tractor 102 indicates that a driver is intending to haul the trailer over-the-road. Embodiments of the invention are configured to sense that the electrical connection has been established between the trailer 104 and a tractor 102 using the electrical line 122, and deactivate the safety lights 106 regardless of the establishment of a pneumatic connection. This sensing, for example, may comprise measuring a "high" voltage reading (12 V) on the electric line 122 coupled to a 7-way plug when the electrical connection is established, and measuring a "low" voltage reading (0 V) when the electrical connection is not established. Typically, 7-way plugs include a hot wire that transfers 12 volt power. The pin connecting to the hot wire may be sampled to determine if the 7-way plug is connected. When the hot wire (12 Volts) is detected it may be determined that the electrical connection is established and that the trailer 104 is to be towed on the roadway. Thus the controller 118 deactivates the safety lights 106.

Further, in some embodiments, the attachment of the electric line 122 may also indicate that the safety lighting system 114 batteries should be charging. The safety lighting system 114 may be powered by a power source 115. In some embodiments, the power source 115 may be a battery or a plurality of batteries. The safety lighting system 114 batteries may include at least one battery controller detecting the state of the batteries and controlling a current to the batteries for charging. In some embodiments, the current may flow from a power source 115 on the tractor 102. The current may flow from the tractor 102 via either the stinger line 128 or via the electric line 122. The electric line 122 may use power generated by the tractor 102 to power the lights, bake lights, reverse lights, blinkers, refrigeration, or any other electrical system on the trailer 104 as well as charge the safety lighting system 114 batteries.

In some embodiments, the stinger line 128 may also be used as a power source 115 to charge batteries for the safety lighting system 114. The safety lighting system 114 batteries may be charged while the spotting tractor 102 is connected to the trailer 104. The safety lighting system 114 batteries may also be charged from a road tractor via stinger line 128 while the trailer 104 is be towed on a roadway. This may provide full charge to the batteries allowing many hours of operation for the safety lighting system 114 while the safety lighting system is not connected to a power generating power source 115.

In some embodiments, power storing devices such as, for example, batteries and power generating devices such as, for example, motors may be referred to generally as power sources. The power source 115 in embodiments described herein may be a battery, but this is not intended to be limiting. In alternative embodiments, the power source 115 may include one or more solar panels, an engine, and/or capacitors. Additionally, the alternative power sources 115 may be connected to a power source battery or the safety lighting system 114 battery to store the generated energy. In some embodiments the power source 115 may be moving parts of the trailer 104 itself. For example, a generator may be connected to the wheels of the trailer 104 and charge the batteries as the trailer 104 is transported from dock to dock or along the roadway. In some embodiments, the batteries store the energy generated by the wheel/generator combination. Any source of power is intended as being within the scope of embodiments of the invention.

In embodiments of the invention, the driver may manually activate the safety lighting system 114 regardless of whether or not pneumatic and/or electrical connections have been established. This may be useful in emergency situations, such as when a road tractor has a breakdown or the trailer 104 needs maintenance without a tractor 102 attached in a distribution warehouse yard. In alternative embodiments, the driver may manually activate the safety lighting system 114 only if the pneumatic connection has been established, but regardless of whether or not the electrical connection has been established. In embodiments of the invention, a driver may manually deactivate the safety lighting system 114, even though a pneumatic connection has been established and an electrical connection has not been established.

Figure 4:
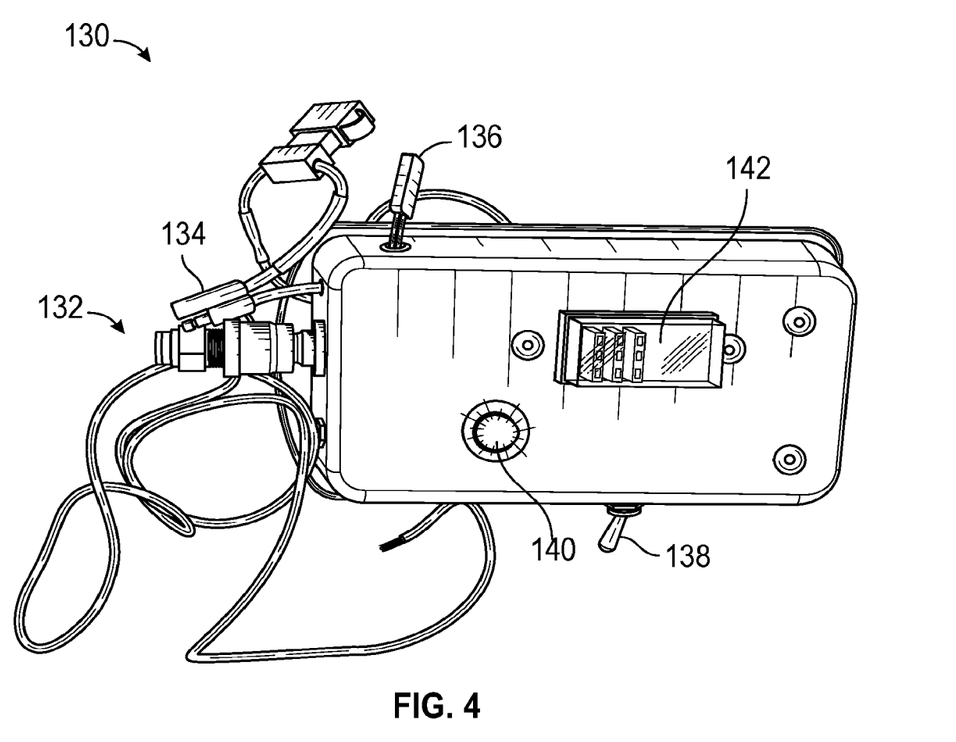
FIG. 4 depicts an exemplary embodiment of a control box for controlling a trailer lighting system.

FIG. 4 depicts an exemplary control box 130 housing the controller 118 and sensor 116 for operating the safety lights 106 in embodiments of the invention. In some embodiments, manual activation and/or deactivation of the safety lighting system 114 may be accomplished by controls (buttons, switches, etc.) mounted on the control box 130 and/or mounted on the trailer 102. Additionally or alternatively, in embodiments of the invention, manual activation, operation, and/or deactivation of the safety lighting system 114 may be accomplished by controls located within the cab of a spotting or road tractor. Additionally or alternatively, in embodiments of the invention, manual activation, operation, and/or deactivation of the safety lighting system 114 may be accomplished by remote connection from an administrative facility, such as a manager's computer or a location-tracking security system. As such, embodiments of the invention may incorporate structures facilitating wireless communication, such as a wireless Internet modem and/or cellular telephone antenna and may be mounted in the control box 130. Additionally or alternatively, in embodiments of the invention the safety lighting system 114 may be activated, operated, and/or deactivated upon sensing of other triggers, such as air bag deployment or hazard light activation. Any appropriate parameter that may be sensed by systems carried by the tractor 102 or trailer 104, such as GPS location, speed, hazard light activation, air bag deployment, or accelerometers may be used as activation and/or deactivation triggers in embodiments of the invention.

In some embodiments of the invention continuing with the illustration in FIG. 4, the control box 130 may comprise external operational components as depicted such as a service line coupler 132, a power line 134, a lighting harness 136, a user input 138, a Light Emitting Diode (LED) 140, and a fuse block 142. Further, the control box 130 may house or comprise any number and combination of processors, controllers, integrated circuits, programmable logic devices, switches, wires, fuses, relays, and/or other data and signal processing devices for carrying out the functions described herein. A controller which, in some embodiments, may be housed within the control box 130 may include memory that may store programmable instructions, including but not limited to volatile and/or non-volatile memory. The control box 130 may be mounted at any location on the trailer 104, including the roof, underneath, sides, front, or back. In some embodiments and additionally to the components depicted, the control box 130 may include external control input structures such as input 138 or additional switches, buttons, keys, etc. for manual control of the safety lighting system 114, as further described below. These external control input structures are not intended to be limiting—any structure by which a driver may manually input information to operate the safety lighting system 114 is intended to be included within embodiments of the invention.

In some embodiments, the control box 130 comprises a service coupler 132. The service coupler 132 may be spliced into the service line 118 with a T-Valve, T-coupler, or by any method that allows the sensor 116 in communication with the controller 118 to be in fluid communication with the pressure source. The sensor 118 may be in electric communication with the controller 118 and when a pressure of a minimum threshold is detected the controller 118 signals the safety lights 106 to activate, change modes, or deactivate. The controller 118 may be programed to control the safety lights 106 at different stages of pressure such that some lights of the plurality of safety lights 106 turn on or off automatically at different pressures, times, or manually. This may indicated different stages, different trailer ratings, or different size trailers based on the pressure needed for the trailer 104.

In some embodiments, the control box 130 may be connected to the power source 115 via the power connector 134. As mentioned above, in embodiments of the invention, the power source 115 may charge when an electrical connection is established between the trailer 104 and a tractor 102. For example, a battery powering an embodiment of the invention may charge when the trailer 104 is electrically connected to the tractor 104 via the electric line 122 which may include a 7-way plug. This may occur automatically, or may be activated by the driver. The safety lighting system 114 may alert the driver when the charge level of the power source 115 falls below a preset threshold. Such an alert may be presented as an audible alarm, visible light, readable text, or any other form appropriate for informing the driver. Alternatively or additionally, in embodiments of the invention, the power source 115 may be charged via a separate charging line connected to the power source 115. In embodiments of the invention, the power source 115 may be partially or completely housed within the control box 130.

The controller 118, which may be housed in the control box 130 may control the function, behavior, and operation of the safety lights 114. As such, in embodiments of the invention the controller 118 is coupled to each of the safety lights 106 mounted on the trailer. The controller 118 may be coupled to the safety lights 106 via the lighting harness 136. The lighting harness 136 may couple the controller 118 to each light of the safety lights 106 or may couple to a light bar that comprises a plurality of lights. The lighting harness 136 may comprise any number of pins that allows the controller 118 to control all safety lights 106 simultaneously through either a light bar configuration or an individual light configuration.

In some embodiments, the controller 118 may control all safety lights 106 with one signal or send different signals to different lights. All safety lights 106 may be the same or some lights may be different colors or may illuminate in different patterns. In this sense the safety lighting system 114 may signal different colors and different strobing patterns to signal different operational modes or warning indications to workers. The different strobing patterns signaled by the safety lights 106 may represent different situations. For example, all safety lights 106 in an on mode may demonstrate that the trailer 104 is in motion. This may be detected by GPS, accelerometer, tire rotation, or a signal from the speedometer. Similarly, blinking safety lights 106 may indicate that the trailer 104 pneumatic system is attached but the trailer 104 is stationary. In some embodiments, it may be useful to employ flashing hazard style safety lights 106 when the trailer 104 or tractor 102 is broken down and no electrical power is accessible by the trailer 104 or when the trailer 104 is undergoing maintenance and a person is working in, on, or below the trailer 104. This may signal a driver that a person is around the trailer 104 and that the trailer 104 is not to be moved. These modes may be controlled and/or programmed by the user or may be automatic based on the condition of the trailer 104.

In some embodiments, the LED 140 illuminates when pressure is detected by the sensor 116 connected to the service line 124. The LED 140 may indicate that the service line 124 has been connected to service coupler 132. This may indicate to the driver that a good connection has been established and that the trailer 104 brakes are no longer engaged. Though, in embodiments described herein, the LED 140 illumination is indicative of a connection between the service line 124 and the service coupler 132, it can be imagined that the LED 124 may be in communication with the emergency line 126, stinger line 128, electric line 122, or any pneumatic, hydraulic, mechanical, or electrical line for indicating when a connection has been made.

In some embodiments, fuse block 142 is accessible on the exterior of the control box 130. This allows the driver to easily change fuses and evaluate any electrical problems that may exist with the controller 118. The fuse block 142 is discussed in more detail below.

Figure 5:
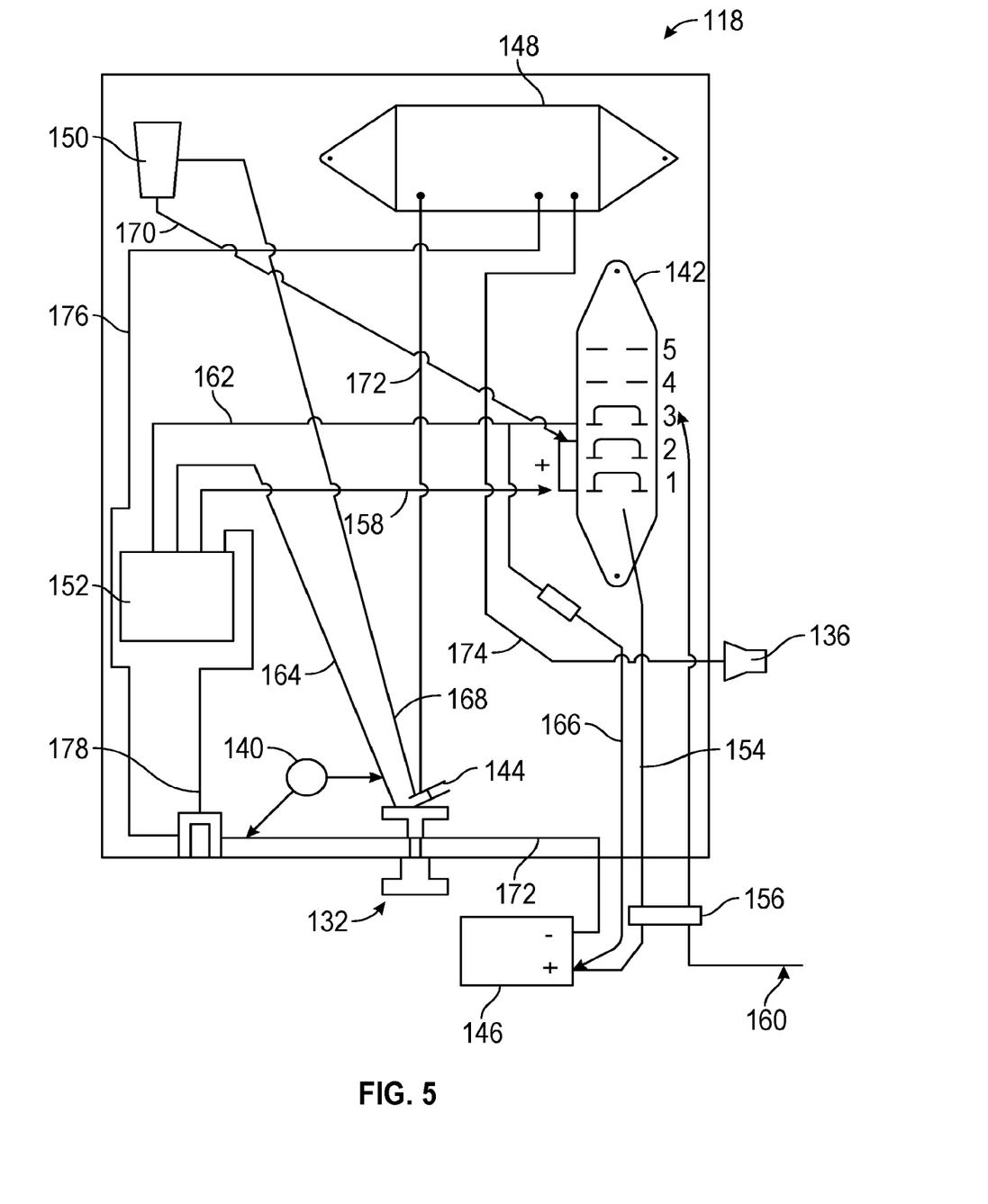
FIG. 5 depicts an exemplary embodiment of a schematic for operation of a safety lighting system.

FIG. 5 depicts the inner circuitry of the exemplary controller 118. The service coupler 132 for receiving air therethrough is set in the control box 130 housing. At an interior side of the service coupler 132 is a pressure sensor 144, which in some embodiments is sensor 116, for detecting the air pressure supplied through the service coupler 132. Power is supplied to the pressure sensor 144, and to all electrical components, an exemplary battery 146 (such as a 12-volt battery) which, in some embodiments may be power source 115, when the electric line 122 is not attached. The battery 146 runs through the fuse block 142 and provides power to a strobe pulse module 148, a maintenance emergency switch 150, a maintenance emergency LED 140, and a relay 152. The main power for the safety lighting system 114 is supplied from the power supply via line 154 through the main fuse 156.

Continuing with the exemplary embodiment of the controller 118 depicted in FIG. 5, the fuse block 142 comprises five fuses. The main power from the power source 115 which in some embodiments is battery 146 to the relay 152 is provided through fuse 1 from the battery 146 via line 154. The power to the relay 152 is provided via line 154 through fuse 1 and along line 158. This provides the power to the relay 152 from the battery 146 when the 7-pin connector is not connected to the trailer 104. When the electric power from the tractor 102 is connected to the trailer 104, the power is provided via line 160 to fuse 3 of the fuse block 142 and along line 162 to the relay 152. Line 160 and subsequently line 162 may be generally referred to as the hot wire for providing the power from the 7-way plug of the tractor 102. If power is detected from the electric input from the tractor 102 then the relay 152 is switched and the safety lights 106 are deactivated.

The relay 152 also receives a signal from the pressure sensor 144 via line 164. The signal indicates if the pressure has reached a minimum threshold to switch the state of the relay 152. When the pressure is connected and above a minimum threshold and there is no electrical power from the 7-way plug, the power is received from the battery 146. When the 7-way plug is connected to line 160 the power supply from the 7-way plug through fuse 3 is detected and the relay 152 is switched from the battery 146. Power for other power needs of trailer 104 as discussed in embodiments above and for detection to deactivate the safety lighting system 114 may be provided through the main fuse via line 158 to fuse 3 of the fuse block 142.

The battery 146 may also be charged from the 7-pin connector electrical power from the tractor 104. Charge line 166 may spice into line 162 to provide power to the battery 146 for charging.

The maintenance and emergency switch 150 activates when there is a loss of pressure from the service coupler 132 as detected by the pressure sensor 144. The power to the maintenance and emergency switch 150 is provided by the power override line 168 from the pressure sensor 144. Power, including 12 volt power from the battery 146, is provided via line 170.

An LED 140 may be included to indicate when the power is supplied to the relay 152 from the battery 146 indicating that the safety lighting system 114 is in operation. The LED 140 may be included at any portion of the circuit to indicate different modes or states of the circuit. The LED may also be used on lines connected to and indicative of the state of mechanical, electrical, pneumatic, or hydraulic connections.

A module power line 172 provides air-pressure-activated power from the battery 146 when the pressure sensor 144 detects a pressure above the minimum threshold as described above. The strobe pulse module 148 sends a signal along line 174 to the safety lighting harness 136 to light the safety lights 106. The strobe pulse module 148 may be programed to light the safety lights in any manner as described above. In some embodiments, the strobe pulse module 148 is a Soundoff Signal ETLEDFC1 model for controlling the lighting sequence of the safety lights 106.

Fuses 4 and 5 are reserved for optional use. Fuse 4 may be connected and provide power therethrough to an alarm. The alarm may indicate when the pressure threshold at pressure sensor 144 has exceeded the minimum pressure threshold. Line 176 provides system ground and line 178 provides relay ground.

Figure 6:
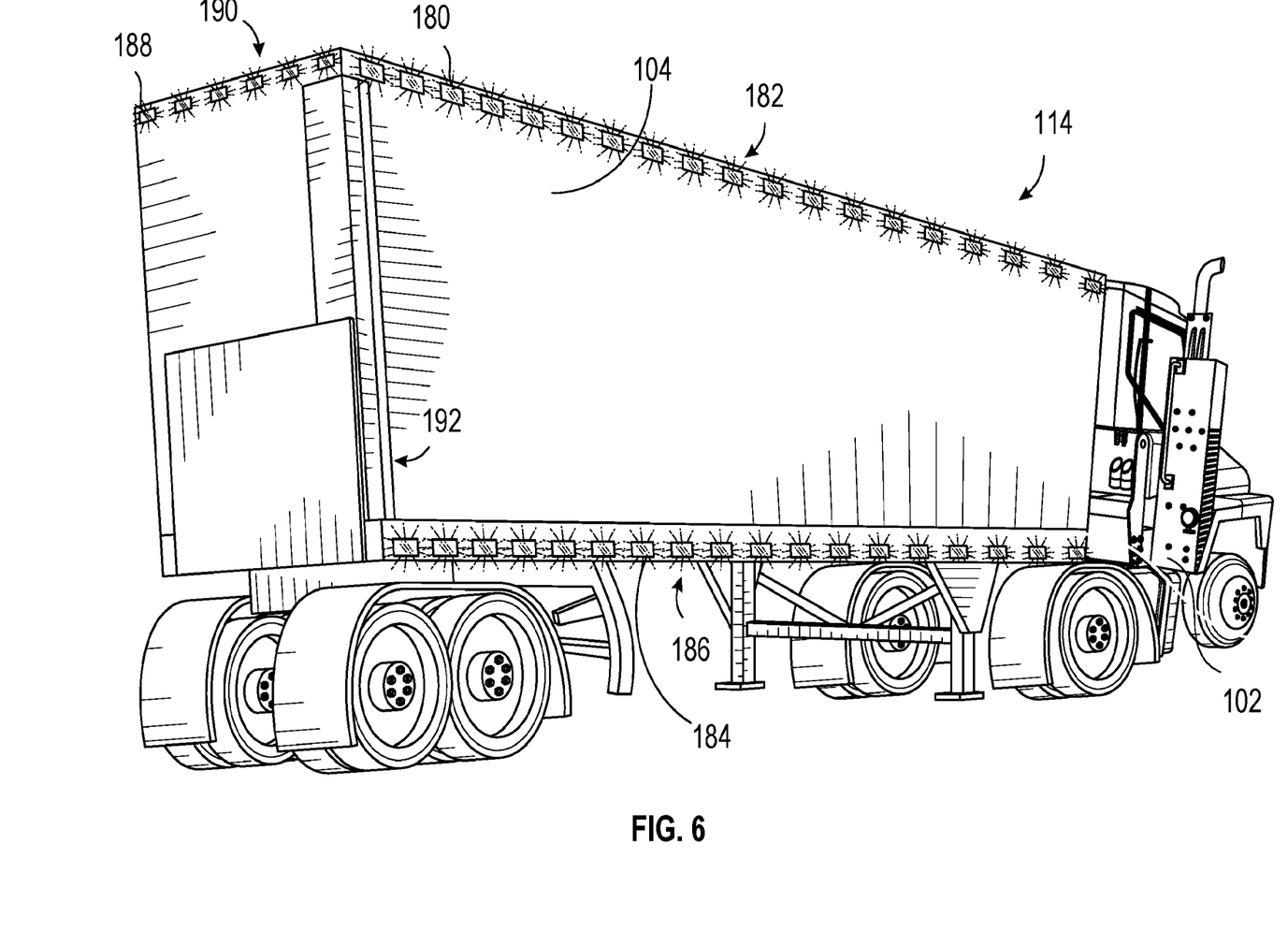
FIG. 6 depicts an exemplary embodiment of a controller fora safety lighting system.

Turning now to FIG. 6 depicting an exemplary embodiment of the safety lighting system 114 implemented on the trailer 104 during operation in combination with the spotting tractor 102 and including safety lights 106. The exemplary safety lighting system 114 includes upper safety lights 180 on the trailer upper portion 182 and lower safety lights 184 on the trailer lower portion 186. In some embodiments, rear upper safety lights 188 may also be placed on the trailer upper rear portion 190 and vertical safety lights (not shown) on the trailer vertical edges 192. The safety lights 106 may be operated manually or automatically illuminated when the service or emergency pneumatic lines are attached. The safety lights 106 may be automatically or manual deactivated when the power switches from the auxiliary power supply to the tractor power supply as supplied by the electrical power connector as described above. Any combination of color, arrangement, and blinking pattern of embodiments of the safety lights 106 and the safety lighting system 114 as described above may be implemented on the trailer 104.

Figure 7:
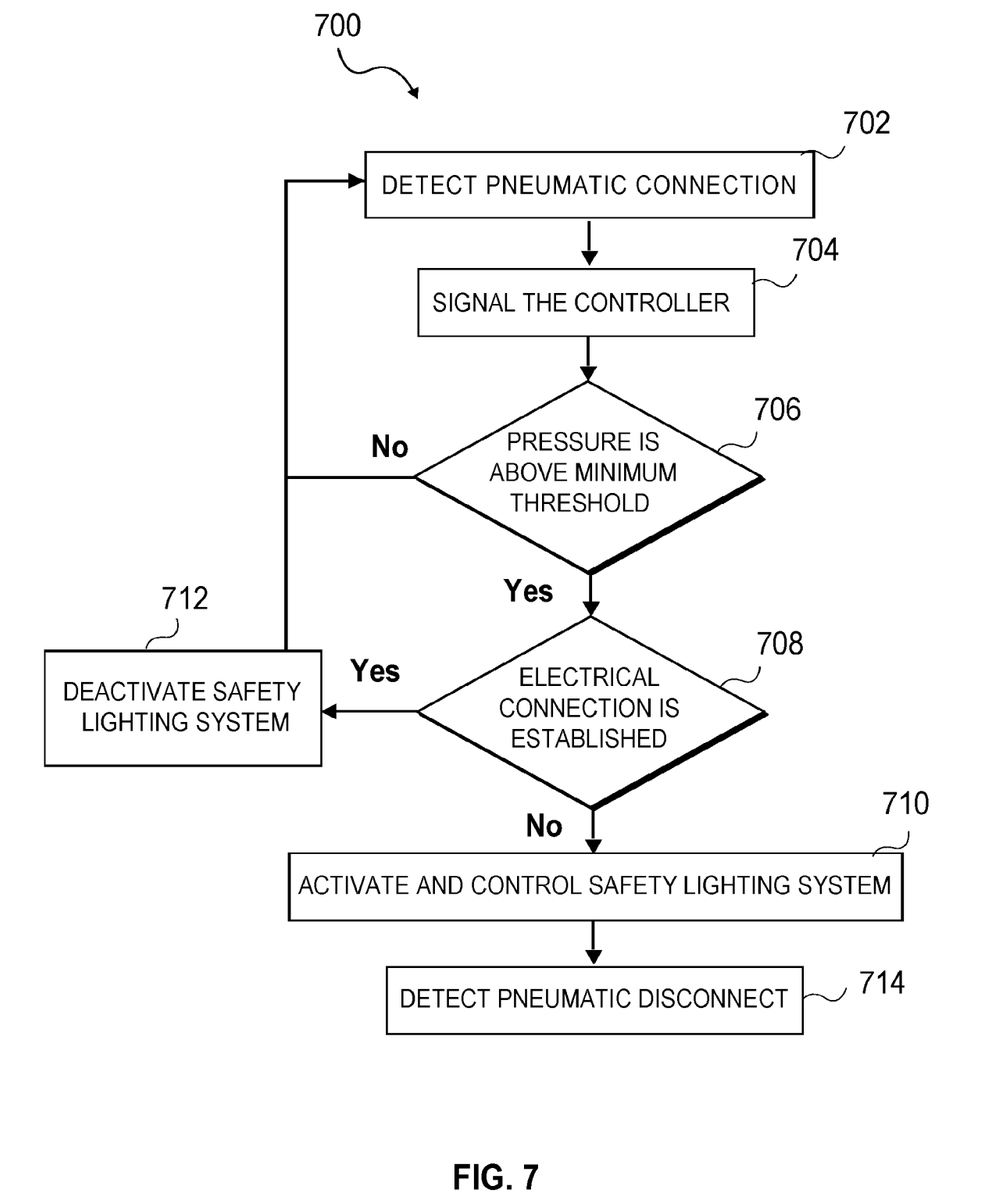
FIG. 7 depicts a flow chart representing an exemplary method for operating embodiments of the invention.

Some embodiments of the invention are depicted in the method 700 presented in FIG. 7. In Step 702, a pressure sensor 144 is electrically attached to a controller 118 and detects a pressure level in a pressure line connected from the trailer 104 to the tractor 102. The pressure sensor 144 may be attached to a pressure line of the trailer 104. In some embodiments, the pressure line leads to the brakes and releases the brakes from a locked position when the pressure is supplied. The pressure sensor 144 may be spliced into the pressure line with a T-valve or three way pressure connector or coupler or in any way that allows the pressure sensor to be in fluid communication with the pressure source. The pressure detected may be supplied by the service line 124 of the tractor 102 as described above.

In Step 704, a signal representative of the pressure supplied through the pneumatic service line 124 is relayed from the pressure sensor 144 to the controller 118 where a switch is activated when the signal indicates that the pressure is above a minimum threshold. When the pressure sensor 144 is in fluid communication with the pressure source supplying pressure to the brakes, the minimum pressure threshold may be any pressure below the pressure required to release the brakes. This enables the safety lighting system 114 to be active at a lower pressure than the brake release. This ensures that the safety lights 106 will be operable if the brakes are released and the trailer 104 is mobile.

In Step 706, the controller 118 determines if the pressure is above a minimum pressure threshold to activate the safety lights 106. If the pressure is below the minimum pressure threshold then the controller 118 continues to evaluate incoming signals from the pressure sensor 144 but the safety lights 106 are not activated. If the signal is above the minimum pressure threshold the safety lights 106 are activated and the controller 118 continues evaluating signals from the pressure sensor 144.

In Step 708, when the pressure is above the minimum pressure threshold, the controller determines if power is supplied from the tractor 103 via, in some exemplary embodiments, a 7-way plug. If the electrical connection from the tractor 102 is not enabled the safety lights 106 are activated and controlled using the controller 118 and powered from the power source 115 as in a fifth step 710. The power source 115 may be a battery or a power generating device such as a generator attached to the wheels of the trailer 104 or any other moving parts, a motor, solar cells, wind mill, or any power generating device attached to the battery. The safety lights 106 may be any color or may remain constantly lit or flash or all of the above as specified by a mode either manually or automatically controlled.

In Step 712, the connection from the tractor is enabled and the safety lighting system 114 is disabled. Detection of the electrical power from the tractor 102 turns off the power supply from the power source 115 thus disabling the safety lighting system 114 on the trailer 104. The regular operations of the trailer 104 are powered by the electrical connection with the tractor 102. Establishing the electrical connection from tractor 102 to the trailer 104 indicates that the trailer 104 is to be towed on the roadway. The electrical systems of the trailer 104 are controlled by the connection with the tractor 102 and the safety lighting system 114 is typically not necessary.

At Step 714, when the electrical connection is not established, the safety lighting system 114 is enabled until the pneumatic connection is disconnected. Upon release of the pressure from the disconnect, the safety lighting system 114 is deactivated.

In some embodiments of the method described above, any embodiments described within the method may be rearranged, omitted, or any embodiments described above may be added as needed to other embodiments.

Embodiments of the invention have been primarily described in relation to a safety lighting system for semi-trailers, but this is not intended to be limiting. Embodiments of the invention may be employed to provide enhanced visibility and safety for any type of towed body, such as a boat or pop-up camper. Additionally, embodiments could be intended for use in maintenance or production facilities rather than distribution warehouses. Any towed structure requiring safety lighting when used in a particular setting is intended as being within the scope of the invention.

Having thus described various embodiments of the invention, what is claimed as new and desired to be protected by Letters Patent includes the following:

1. A lighting system for a trailer that activates based on a pneumatic connection between the trailer and a vehicle, comprising:
    at least one light disposed on the trailer;
    a pressure sensor for detecting a pressure of the pneumatic connection between the trailer and the vehicle; and
    a controller configured to:
        receive an output of the pressure sensor indicative of the pressure from the pressure sensor; and
        illuminate the at least one light to indicate an operational mode of the trailer when the pressure detected by the pressure sensor reaches a threshold pressure and when a signal is received that an electrical connection between the trailer and the vehicle is not established,
        wherein the operational mode of the trailer is indicative of non-roadway use.

2. The lighting system of claim 1, wherein the threshold pressure is a function of a required pressure to release a set of brakes of the trailer.

3. The lighting system of claim 1,
    wherein the threshold pressure is a first threshold pressure, and
    wherein the controller is further configured to cause a change in an operation of the at least one light when the pressure detected by the pressure sensor reaches a second threshold pressure.

4. The lighting system of claim 1, wherein the lighting system further comprises a user input for operation by a user to manually illuminate the at least one light.

5. The lighting system of claim 1, wherein the at least one light is configured to be deactivated when the electrical connection between the trailer and the vehicle is detected.

6. The lighting system of claim 1,
    wherein a power source for powering the at least one light is at least one battery, and
    wherein the at least one battery is charged by a 7-pin electrical connection disposed on the trailer.

7. The lighting system of claim 1, wherein the trailer is towed by the vehicle and the vehicle is a spotting tractor.

8. A method of illuminating a lighting system of a trailer based at least in part on a pneumatic connection between the trailer and a vehicle, the method comprising the steps of:
    connecting the trailer and the vehicle using the pneumatic connection;
    detecting, by a pressure sensor, a pressure of the pneumatic connection;
    determining if the pressure reaches a threshold pressure, wherein the threshold pressure is substantially a minimum pressure required to release a brake on the trailer; and
    when the pressure reaches the threshold pressure and a signal is received that an electrical connection between the trailer and the vehicle is not established, illuminating, by a controller, at least one light to indicate an operational mode of the trailer using a power source,
    wherein the at least one light and the power source are disposed on the trailer, and
    wherein the operational mode of the trailer is non-roadway use.

9. The method of claim 8, further comprising the step of sending an alert when a charge level of the power source powering the at least one light falls below a preset threshold.

10. The method of claim 8, wherein the operational mode of the trailer is a first operational mode, and further comprising the steps of:
    detecting a second operational mode of the trailer,
    wherein the second operational mode is detected by at least one of a GPS location, an accelerometer reading, a tire rotation, or a speed associated with the trailer; and
    adjusting, by the controller, the at least one light based on the second operational mode of the trailer.

11. The method of claim 8, further comprising the steps of:
    determining if the pressure reaches a second threshold pressure; and
    when the pressure reaches the second threshold pressure, causing a change in an operation of the at least one light.

12. The method of claim 8, further comprising the steps of:
    connecting the trailer and the vehicle with the electrical connection; and deactivating the at least one light when the electrical connection is detected.

13. The method of claim 8, further comprising the step of automatically deactivating the at least one light when the pneumatic connection is disconnected.

14. A lighting system for a trailer that activates based on a pneumatic connection between the trailer and a vehicle, comprising:
   at least one light disposed on the trailer;
   a service line for making the pneumatic connection between the vehicle and the trailer;
   a pressure sensor for detecting a pressure of the service line; and
   a controller configured to illuminate the at least one light indicating an operational mode of the trailer when the pressure detected by the pressure sensor reaches a threshold pressure and a signal is received that an electrical connection between the trailer and the vehicle is not established,
   wherein the operational mode of the trailer is non-roadway use.

15. The lighting system of claim 14,
   wherein a power source for the at least one light is at least one battery,
   wherein the lighting system further comprises a stinger line for carrying electrical power and ground for the at least one battery, and
   wherein the stinger line is configured to charge the at least one battery.

16. The lighting system of claim 14, wherein the controller is further configured to illuminate the at least one light upon detecting at least one of an airbag deployment or a hazard light activation.

17. The lighting system of claim 14, wherein the controller is further configured to adjust a color of the at least one light based on a mode of operation of the lighting system.

18. The lighting system of claim 14, wherein the controller is further configured to programmatically control a lighting sequence for the at least one light.

19. The lighting system of claim 14,
   wherein the lighting system further comprises a control box for housing the controller, and
   wherein the control box comprises an LED configured to illuminate when the pneumatic connection has been made and a set of brakes of the trailer are not engaged.

20. The lighting system of claim 14, wherein the at least one light is configured to be deactivated when the electrical connection between the trailer and the vehicle is detected.

* * * * *